(12) United States Patent
Go et al.

(10) Patent No.: US 11,415,288 B2
(45) Date of Patent: Aug. 16, 2022

(54) LAMP FOR VEHICLE

(71) Applicant: SL Corporation, Daegu (KR)

(72) Inventors: Dong Hyun Go, Gyeongsan-si (KR); Hyo Jin Han, Gyeongsan-si (KR); Joo Jin Chang, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 17/352,435

(22) Filed: Jun. 21, 2021

(65) Prior Publication Data

US 2022/0026038 A1    Jan. 27, 2022

(30) Foreign Application Priority Data

Jul. 21, 2020 (KR) .................. 10-2020-0090242

(51) Int. Cl.
| | |
|---|---|
| *F21S 41/43* | (2018.01) |
| *F21S 41/14* | (2018.01) |
| *G02B 3/00* | (2006.01) |
| *F21W 107/10* | (2018.01) |
| *F21W 102/155* | (2018.01) |
| *F21V 8/00* | (2006.01) |
| *F21V 11/14* | (2006.01) |
| *F21S 41/40* | (2018.01) |

(52) U.S. Cl.
CPC ............ *F21S 41/43* (2018.01); *F21S 41/18* (2018.01); *G02B 3/0056* (2013.01); *F21S 41/40* (2018.01); *F21V 11/14* (2013.01); *F21W 2102/155* (2018.01); *F21W 2107/10* (2018.01); *G02B 6/0021* (2013.01)

(58) Field of Classification Search
CPC ............ F21S 41/40; F21S 41/43; F21V 11/14
See application file for complete search history.

(56) References Cited

U.S. PATENT DOCUMENTS

| | | | |
|---|---|---|---|
| 6,769,777 B1 * | 8/2004 | Dubin .................. | F21V 11/186 353/97 |
| 10,232,763 B1 * | 3/2019 | Eckstein ............... | F21S 41/285 |
| 10,274,153 B2 * | 4/2019 | Kim ...................... | F21S 41/40 |
| 10,465,874 B2 * | 11/2019 | Kamau ................ | F21S 41/265 |
| 10,746,370 B2 * | 8/2020 | Han ...................... | F21S 41/265 |
| 10,962,191 B1 * | 3/2021 | Go ....................... | G02B 19/0014 |
| 11,060,685 B2 * | 7/2021 | Schadenhofer ......... | F21S 41/24 |

(Continued)

FOREIGN PATENT DOCUMENTS

| | | | | |
|---|---|---|---|---|
| KR | 20200039600 A * | 4/2020 | ............ | F21S 41/255 |
| WO | WO-2019110374 A1 * | 6/2019 | ............ | F21S 41/265 |

*Primary Examiner* — Colin J Cattanach
(74) *Attorney, Agent, or Firm* — United One Law Group LLC; Kongsik Kim; Jhongwoo Peck (57) ABSTRACT

Provided is a lamp for a vehicle capable of forming a plurality of different beam patterns. The vehicle lamp includes a light source system, a lens system, and a shield system. The lens system includes a plurality of incident lenses onto which light emitted from the light source system is incident and a plurality of exit lenses to output the light incident thereto from the plurality of incident lenses to form a predetermined beam pattern. The shield system includes a plurality of main shields to block some of light beams from being directed to the plurality of exit lenses, wherein each of the plurality of shields includes a blocking surface to block a light beam from being directed to the plurality of exit lenses and at least one transmission hole formed in the blocking surface.

10 Claims, 12 Drawing Sheets

(56) References Cited

U.S. PATENT DOCUMENTS

| | | | |
|---|---|---|---|
| 2016/0010811 A1* | 1/2016 | Benitez | F21S 41/153 |
| | | | 362/509 |
| 2016/0230948 A1* | 8/2016 | Kratochvil | F21S 41/24 |
| 2017/0146212 A1* | 5/2017 | Jo | F21S 43/26 |
| 2018/0320852 A1* | 11/2018 | Mandl | F21S 41/322 |
| 2019/0072252 A1* | 3/2019 | Moser | F21S 41/686 |
| 2020/0300435 A1* | 9/2020 | Mandl | F21S 41/43 |

* cited by examiner

LAMP FOR VEHICLE

CROSS-REFERENCE TO RELATED APPLICATION

This application claims priority to Korean Patent Application No. 10-2020-0090242 filed on Jul. 21, 2020, which application is incorporated herein by reference in its entirety.

BACKGROUND

1. Technical Field

The present disclosure relates to a lamp for a vehicle, and more particularly, to a lamp for a vehicle capable of forming a plurality of different beam patterns.

2. Description of Related Art

A vehicle is equipped with various types of lamps having an illumination function to easily identify objects located around the vehicle during low-light conditions (e.g., night driving), and a signaling function to inform a driver of another vehicle or a pedestrian around the vehicle of a driving state of the vehicle.

For example, head lamps and fog lamps are mainly intended for the illumination functions. Turn signal lamps, tail lamps, brake lamps, and the like are mainly for the signaling functions. Installation standards and requirements of the lamps are stipulated by laws and regulations to fully exhibit corresponding functions.

In general, a lamp for each function is installed in the vehicle. In this case, not only an optical system constituting each lamp is required separately, but also an installation space required for each lamp is increased, such that there is a possibility that cost increases and space utilization decreases.

Further, some of light beams irradiated from each lamp is blocked via a shield, based on a beam pattern to be formed by each lamp. In this case, there is a possibility that the light efficiency may decrease due to the light blocked by the shield.

Accordingly, there is a need for a scheme for simplifying a configuration required to implement at least two functions, thereby reducing the cost and improving the space utilization, and further improving light efficiency.

SUMMARY

Aspects of the present disclosure provide a lamp for a vehicle in which a configuration may be simplified and a cost may be lowered via shared use of an optical system for forming different beam patterns.

Further, an object of the present disclosure is to provide a lamp for a vehicle in which light efficiency may be improved by reusing the light that is blocked by a shield.

Objects in accordance with the present disclosure are not limited to the above-mentioned purpose. Other objects and advantages in accordance with the present disclosure not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

According to an aspect of the present disclosure, a vehicle lamp may include a light source system, a lens system, and a shield system. The lens system may include a plurality of incident lenses onto which light emitted from the light source system is incident; and a plurality of exit lenses to output the light incident thereto from the plurality of incident lenses to form a predetermined beam pattern. The shield system may include a plurality of main shields to block some of light beams from being directed to the plurality of exit lenses. In particular, each of the plurality of main shields may include a blocking surface to block at least some of the light beams from being directed to the plurality of exit lenses; and at least one transmission hole formed within the blocking surface to allow transmission of some other of the light beams.

The light source system may include a first light source for generating light for forming a first beam pattern; a second light source for generating light for forming a second beam pattern; and an optical path adjustment member for adjusting a path of light emitted from at least one of the first light source or the second light source. The first light source and the second light source may be configured to respectively generate light beams having different luminous intensities. The first light source may be disposed near a central axis of the lens system, and the second light source may be disposed above and/or below the first light source.

Some of light beams blocked by the blocking surface of each of the plurality of main shields among entire light beams emitted from at least one of the first light source or the second light source may be transmitted to the plurality of exit lenses through the at least one transmission hole. The at least one transmission hole may be arranged in a regular pattern in each of the plurality of main shields. The at least one transmission hole may allow the beam pattern to expand downwards to form an expanded region.

A position of the at least one transmission hole in one of the plurality of main shields may be formed differently from a position of the at least one transmission hole in another of the plurality of main shields. A position of the at least one transmission hole formed in each of the plurality of main shields may vary based on at least one of a distance or a direction of each main shield from a reference main shield.

The shield system may further include a plurality of auxiliary shields respectively disposed in front of the plurality of main shields. A top of each of the plurality of auxiliary shields may be disposed below a top of corresponding main shield among the plurality of main shields.

The lens system may further include a first optical member having an incident surface and an exit surface, wherein the plurality of incident lenses are arranged on the incident surface of the first optical member; and a second optical member having an incident surface and an exit surface, wherein the incident surface of the second optical member faces the exit surface of the first optical member, and the plurality of exit lenses are arranged on the exit surface of the second optical member. The plurality of main shields may be arranged on the incident surface of one of the first optical member or the second optical member, and the plurality of auxiliary shields may be arranged on the exit surface of one of the first optical member or the second optical member.

The lamp for the vehicle according to the present disclosure as described above may have one or more of following effects. A plurality of different beam patterns may be formed by light beams respectively incident from light sources having different positions. Thus, the optical system for forming the plurality of different beam patterns may be shared, thus allowing the configuration to be simplified, and the cost to be reduced.

Further, the beam pattern may be expanded by forming at least one transmission hole in a blocking surface of the shield that blocks some of light beams incident from the light source system in order to form a cut-off line of the beam pattern. Thus, visibility and the light efficiency may be improved.

In addition to the effects as described above, specific effects in accordance with the present disclosure will be described together with the detailed description set forth below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTIONS

Advantages and features of the present invention and methods of accomplishing the same may be understood more readily by referring to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the invention are described herein with reference to plan and cross-section illustrations that are schematic illustrations of idealized embodiments of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. In the drawings, respective components may be enlarged or reduced in size for convenience of explanation.

Hereinafter, the present disclosure will be described with reference to drawings for describing a lamp for a vehicle based on exemplary embodiments of the present disclosure.

Figure 1:
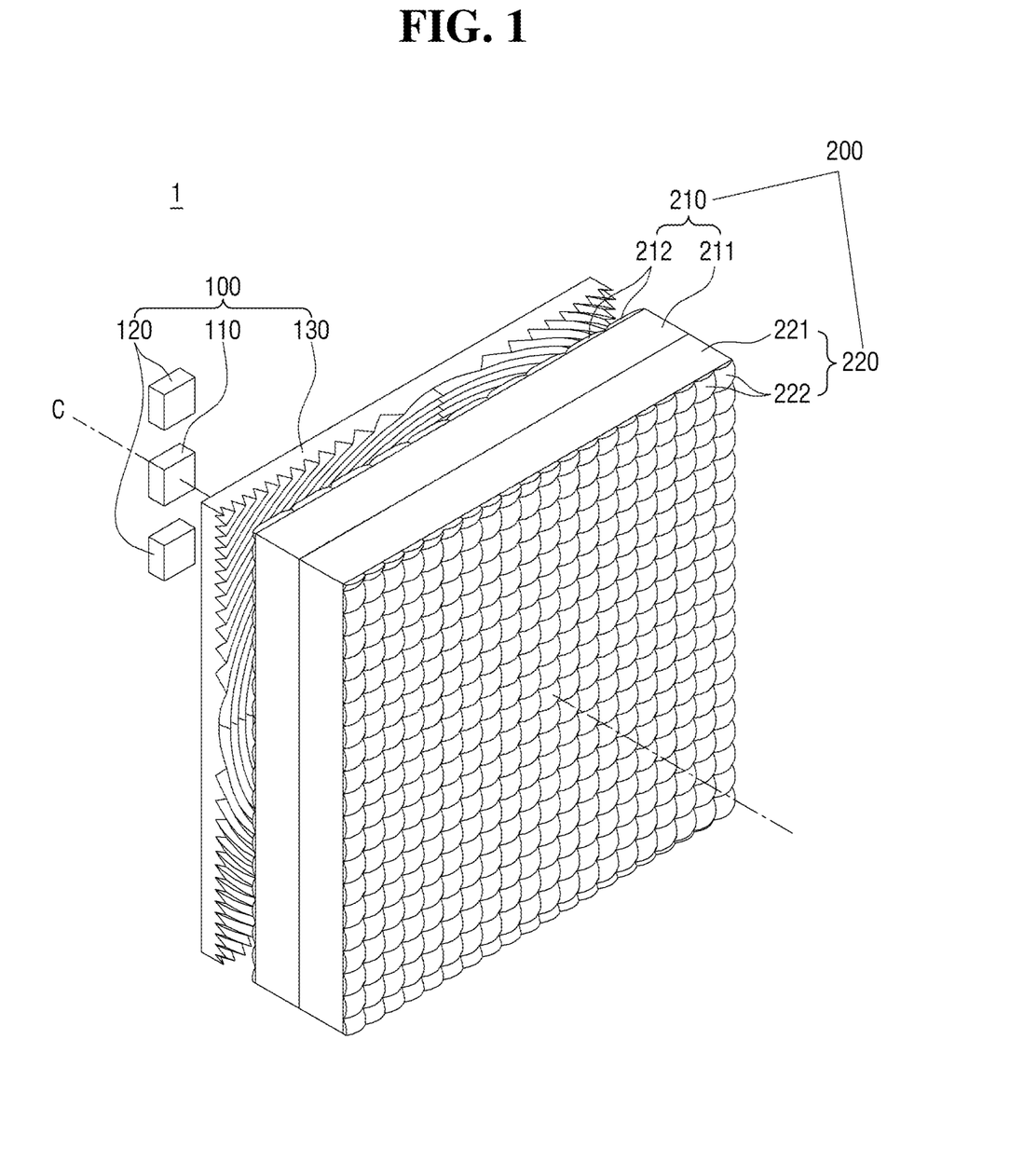
FIGS. 1 and 2 are perspective views showing a lamp for a vehicle according to an exemplary embodiment of the present disclosure.
Figure 2:
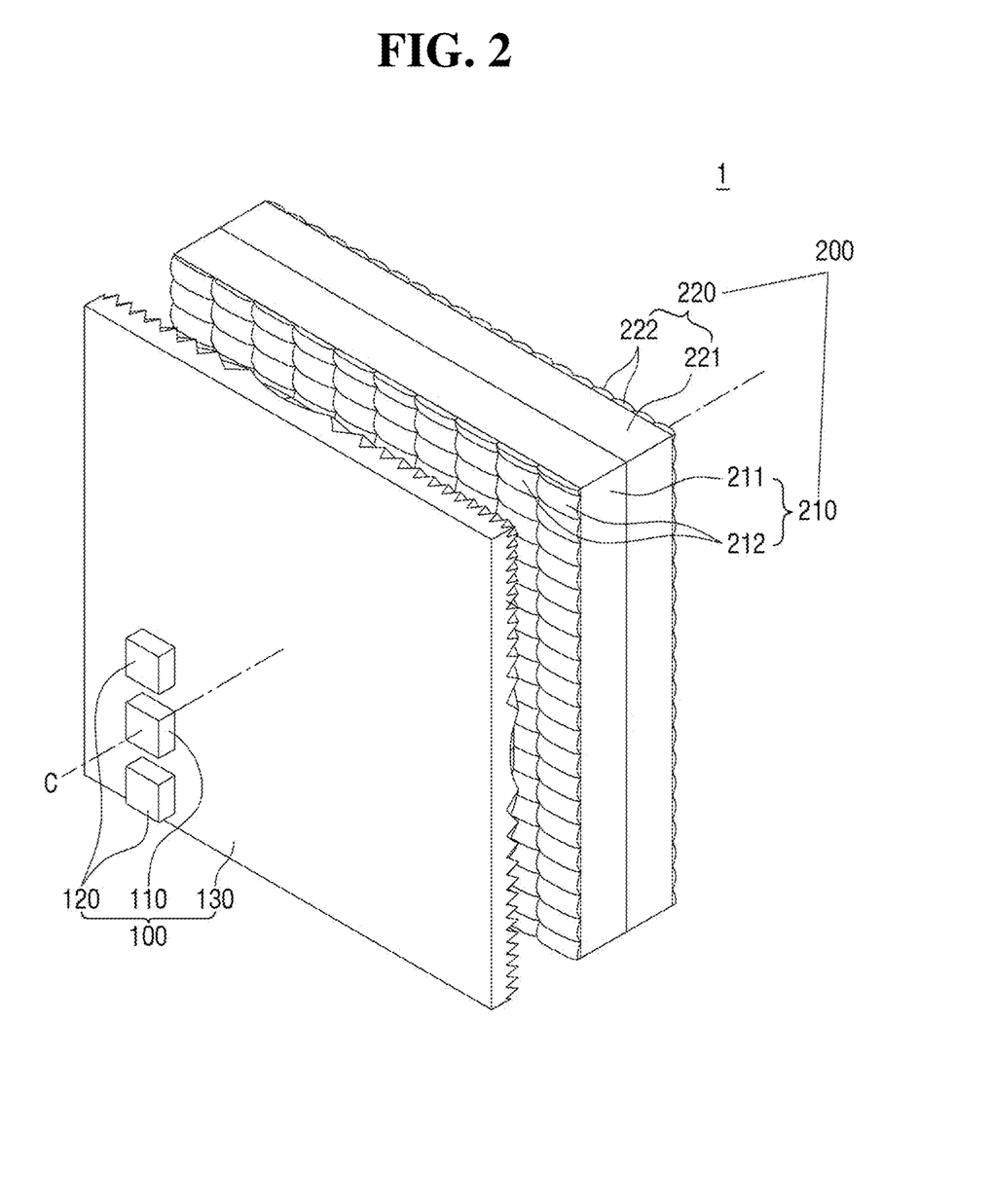
Figure 3:
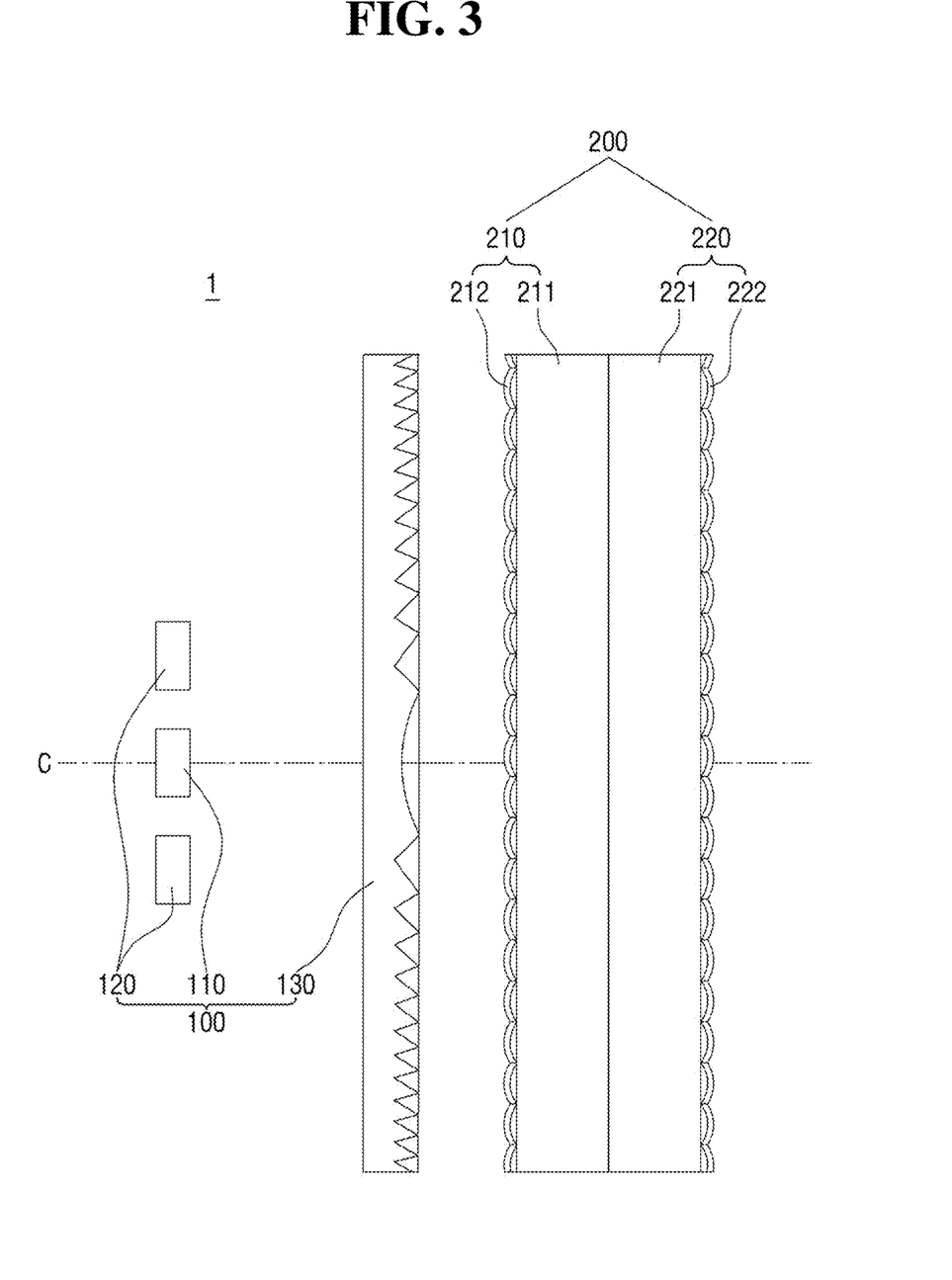
FIG. 3 is a side view showing a lamp for a vehicle according to an exemplary embodiment of the present disclosure.
Figure 4:
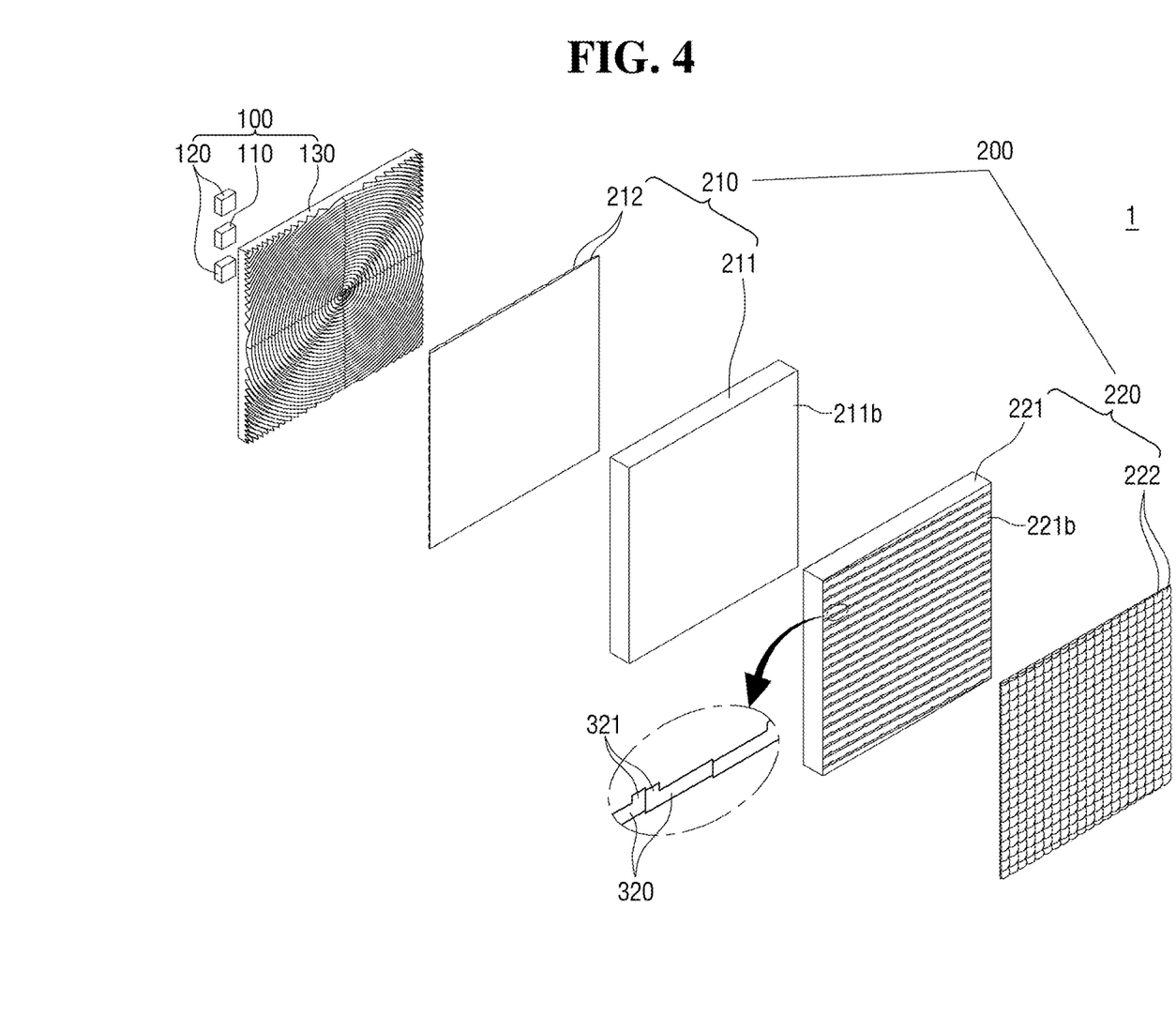
FIGS. 4 and 5 are exploded perspective views showing a lamp for a vehicle according to an exemplary embodiment of the present disclosure.
Figure 5:
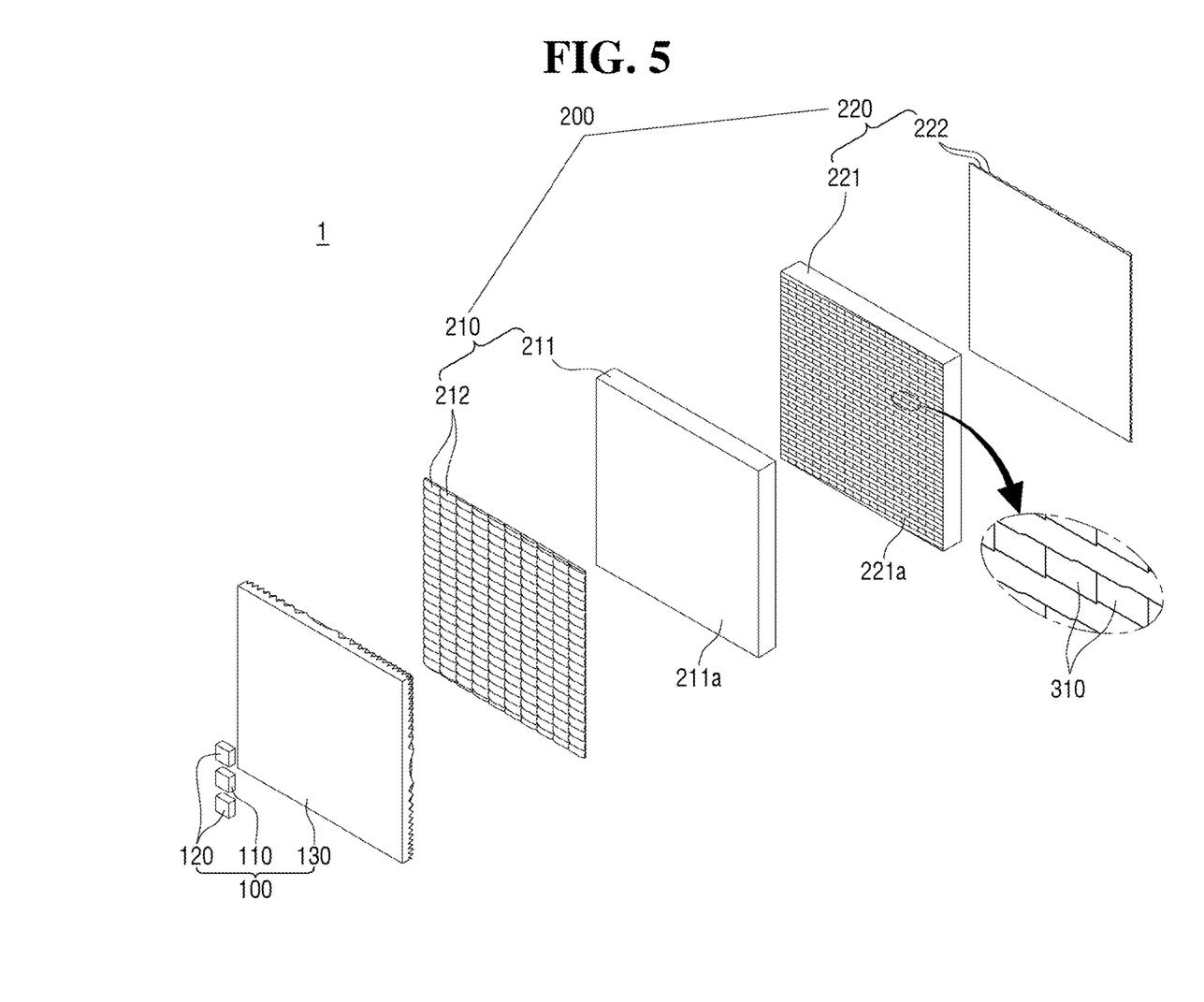

FIGS. 1 and 2 are perspective views showing a lamp for a vehicle according to an exemplary embodiment of the present disclosure. FIG. 3 is a side view showing a lamp for a vehicle according to an exemplary embodiment of the present disclosure. FIG. 4 and FIG. 5 are exploded perspective views showing a lamp for a vehicle according to an exemplary embodiment of the present disclosure.

Referring to FIGS. 1 to 5, a lamp 1 for a vehicle according to an exemplary embodiment of the present disclosure may include a light source system 100, a lens system 200, and a shield system 300.

In an exemplary embodiment of the present disclosure, an example in which the lamp 1 for a vehicle is used as a head lamp to secure a front view by irradiating light in a driving direction of the vehicle when the vehicle is operating in low-light conditions such as at night or in a dark place such as a tunnel is described. However, the present disclosure is not limited thereto. The lamp 1 for the vehicle according to the present disclosure may be used not only for the head lamp, but also for various lamps installed in the vehicle such as daytime running lamps, tail lamps, brake lamps, fog lamps, position lamps, turn signal lamps, and backup lamps. The lamp 1 for the vehicle according to the present disclosure may be used for a single purpose among the aforementioned purposes, or may be used for a combination of two or more purposes.

The light source system 100 may include a first light source 110, a second light source 120, and an optical path adjustment member 130, and may generate light having an amount and/or a color suitable for use in the lamp 1 for the vehicle according to the present disclosure.

The first light source 110 may generate light for forming a first beam pattern. The second light source 120 may generate light to form a second beam pattern that is different from the first beam pattern. In an exemplary embodiment of the present disclosure, the description is given for an example in which the first beam pattern provides a low beam pattern in which light is irradiated onto an area below a predetermined cut-off line so that glare does not occur to a driver of a proceeding vehicle or an on-coming vehicle, whereas the second beam pattern may provide a beam pattern corresponding to a daytime running lamp (DRL) that enables easy identification of an object during daytime driving of the vehicle. However, the present disclosure is not limited thereto. The beam patterns respectively formed using the light beams emitted from the first light source 110 and the second light source 120 may be variously changed based on the functions of the lamp 1 for the vehicle according to the present disclosure.

In an exemplary embodiment of the present disclosure, an example in which each of the first light source 110 and the second light source 120 includes at least one semiconductor light emission device such as light emitting diode (LED) will be described. However, the present disclosure is not limited thereto. Each of the first light source 110 and the second light source 120 may employ not only the semiconductor light emission device, but also various other types of light sources such as a bulb or a laser diode (LD). Optical elements such as lenses, mirrors, prisms, and reflectors that affect light properties such as a path or brightness of each of the light beams emitted from the first light source 110 and the second light source 120 may be additionally used depending on a type of the light source.

As described above, the lamp 1 for the vehicle according to the present disclosure may include the first light source 110 and the second light source 120 to generate the first beam pattern and the second beam pattern, respectively. Thus, an optical system may be shared for generating the first beam pattern and the second beam pattern. Accordingly, the configuration of the lamp may be simplified, and the cost thereof may be reduced.

Further, in an exemplary embodiment of the present disclosure, a case where the light emitted from the second light source 120 has a relatively low luminous intensity compared to that of the light emitted from the first light source 110 is described by way of example. However, this is to help understanding the present disclosure and is only an example. The disclosure is not limited thereto, and the luminous intensity of each of light beams respectively emitted from the first light source 110 and the second light source 120 may vary based on each of the beam patterns respectively formed using the light beams emitted from the first light source 110 and the second light source 120.

The optical path adjustment member 130 may be disposed in front of the first light source 110 and the second light source 120 and may control a light path such that the light emitted from at least one of the first light source 110 or the second light source 120 travels in a direction parallel to a central axis C of the lens system 200, that is, the front-and-rear direction. This configuration may allow the light emitted from at least one of the first light source 110 or the second light source 120 to be incident onto the lens system 200 with a minimal loss and may allow the light to be incident uniformly onto the lens system 200.

In an exemplary embodiment of the present disclosure, a case where the optical path adjustment member 130 is embodied as a Fresnel lens will be described by way of example. The Fresnel lens may include several annular lenses to allow construction of a thin optical path adjustment member and to control the light path such that the light emitted from at least one of the first light source 110 or the second light source 120 travels in the front-and-rear direction. However, the disclosure is not limited thereto. The optical path adjustment member 130 may employ not only the Fresnel lens, but also various types of collimator lenses capable of adjusting the path of light emitted from at least one of the first light source 110 or the second light source 120, such as an aspherical lens.

The first light source 110 may be disposed at or near the central axis C of the lens system 200, for example, at or below the central axis C, while the second light source 120 may be disposed above and/or below the first light source 110. This configuration allows a cut-off line of the low beam pattern formed by the light emitted from the first light source 110 to be disposed in a correct position. Further, due to this configuration, a beam pattern corresponding to the daytime running lamp formed by the light emitted from the second light source 120 may include at least a portion disposed above and/or below the low beam pattern so that the portion may be identified without affecting the cut-off line of the low beam pattern.

Figure 6:
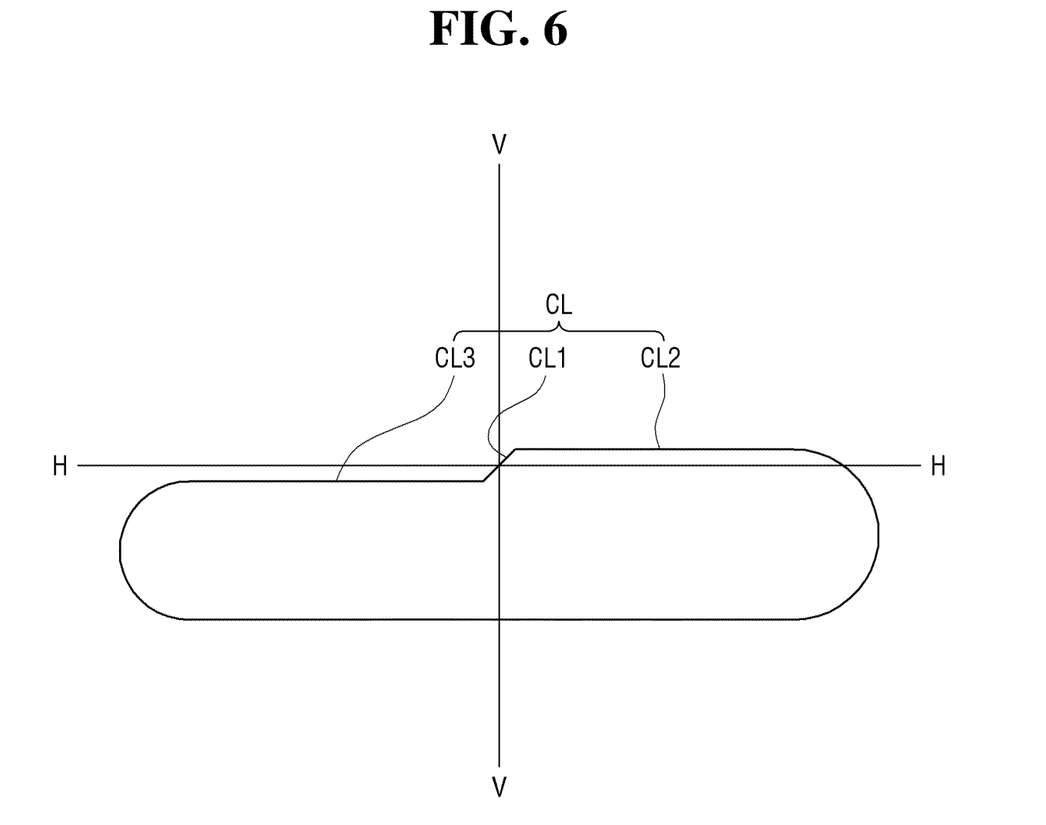
FIG. 6 is a schematic diagram showing a first beam pattern formed by a lamp for a vehicle according to an exemplary embodiment of the present disclosure.

FIGS. 1 to 5 show an example where the second light sources 120 are disposed above and below the first light source 110, respectively. In this case, the first beam pattern formed when the first light source 110 is turned on may correspond to a low beam pattern in which the light is irradiated onto an area below the cut-off line CL having a predetermined shape as shown in FIG. 6. The second beam patterns may be respectively formed below and above the low beam pattern, as shown in FIG. 7, when the second light sources 120 respectively located below and above the first light source 110 are turned on.

Figure 7:
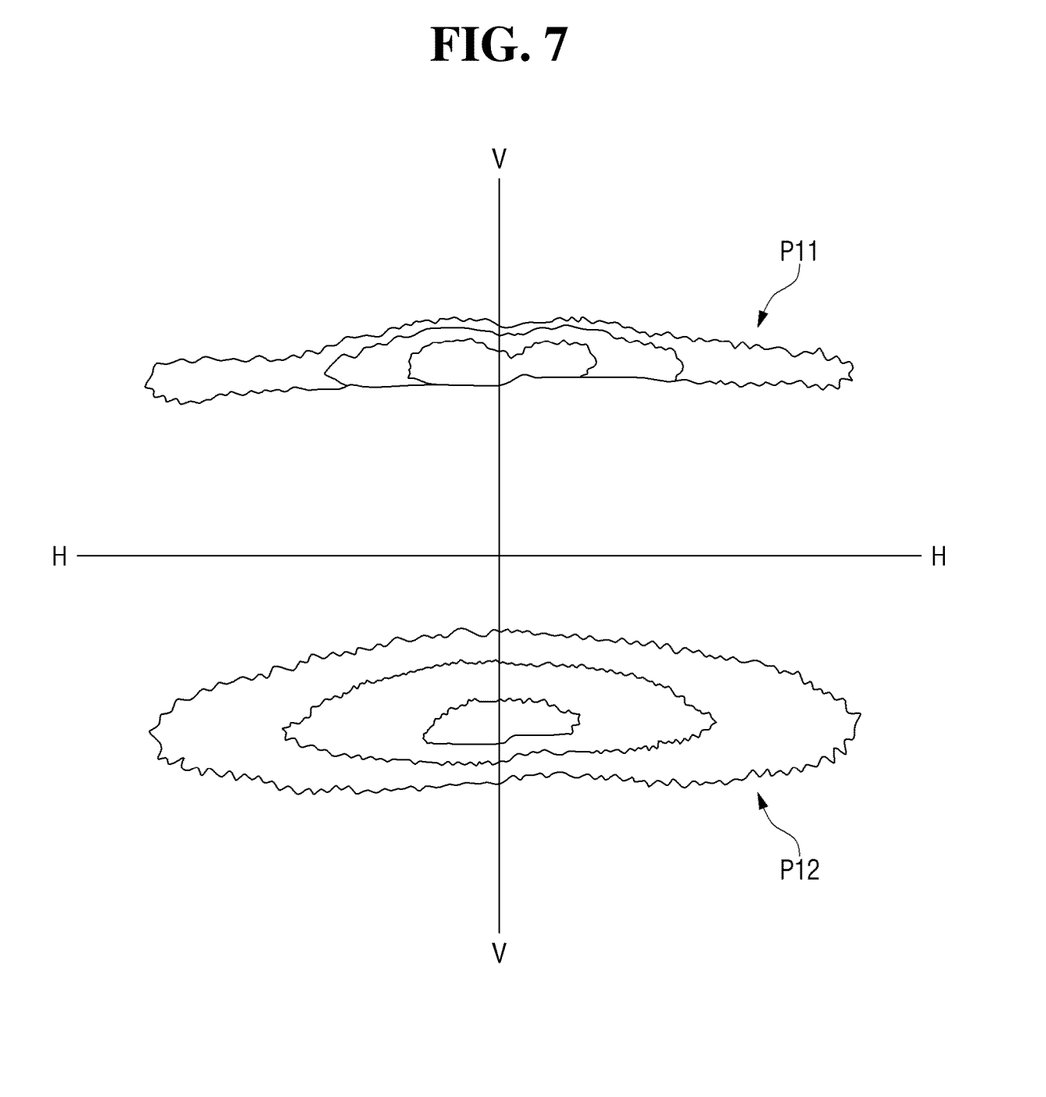
FIG. 7 is a schematic diagram showing a second beam pattern formed by a lamp for a vehicle according to an exemplary embodiment of the present disclosure.

FIG. 7 shows an example of the second beam pattern including a plurality of beam patterns P11 and P12 in which at least a portion thereof is disposed above and below the low beam pattern. The upper beam pattern P11 among the plurality of beam patterns P11 and P12 may be formed by the second light source 120 that is positioned below the first light source 110, while the lower beam pattern P12 among the plurality of beam patterns P11 and P12 may be formed by the second light source 120 that is positioned above the first light source 110. It is preferable that the second light source 120 is positioned below and/or above the first light source 110 so that easy identification of the pattern may be possible even at a relatively long distance.

In the above exemplary embodiment, a case where the light source system 100 includes the first light source 110 for forming the first beam pattern and the second light source 120 for forming the second beam pattern is described by way of example. However, the present disclosure is not limited thereto. The number or the location of light sources included in the light source system 100 may vary depending on a type of the beam pattern formed by the lamp 1 for the vehicle according to the present disclosure.

The lens system 200 may include an incident lens unit 210 and an exit lens unit 220. The incident lens unit 210 may include a first optical member 211 and a plurality of incident lenses 212. The first optical member 211 may be made of a material through which light transmits, such as glass, so that the light incident from the light source system 100 may proceed to the exit lens unit 220 that is disposed in front of the incident lens unit 210.

The plurality of incident lenses 212 may be disposed on an incident surface 211a of the first optical member 211 that faces the light source system 100. According to an exemplary embodiment of the present disclosure, each of the plurality of incident lenses 212 may be made of a material such as polymer or epoxy, and may employ a micro-lens having a relatively short focal point distance to reduce an overall size of the lamp 1 for the vehicle according to the present disclosure for miniaturization. The plurality of incident lenses 212 may be arranged in a matrix form including at least one row extending in a horizontal direction and at least one column extending in a vertical direction. The row in the left-and-right direction of the plurality of incident lenses 212 may be horizontal or inclined by a predetermined angle with respect to the horizontal direction.

The exit lens unit 220 may include a second optical member 221 and a plurality of exit lenses 222. The second optical member 221 may be oriented so that an incident surface 221a thereof faces an exit surface 211b of the first optical member 211. The plurality of exit lenses 222 may be arranged on the exit surface 221b of the second optical member 221. The second optical member 221 may be made of a material that transmits light in a similar manner as the first optical member 211. Similar to the plurality of incident lenses 212, each of the plurality of exit lenses 222 may be embodied as a micro-lens having a relatively short focal point distance. The plurality of exit lenses 222 may be arranged in a matrix form including at least one row extending in a horizontal direction and at least one column extending in a vertical direction. The row in the left-and-right direction of the plurality of exit lenses 222 may be inclined by an angle that corresponds to the inclination angle of the row in the left-and-right direction of the plurality of incident lenses 212.

The shield system 300 may be disposed between the plurality of incident lenses 212 and the plurality of exit lenses 222 to block or obstruct some of light beams from being incident on the plurality of exit lenses 222, and thus to form a beam pattern that is suitable for a function of the lamp 1 for the vehicle according to the present disclosure.

Figure 8:
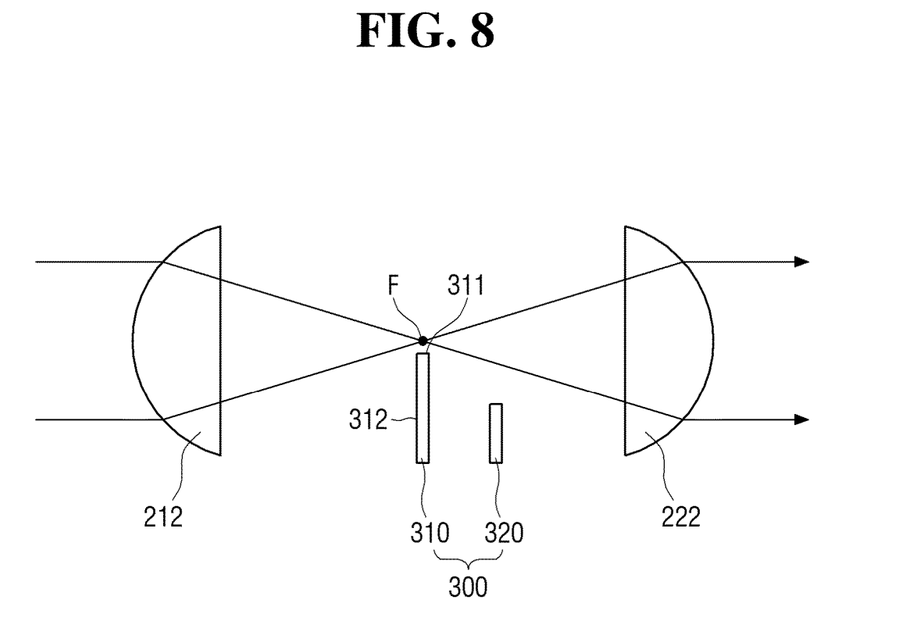
FIG. 8 is a schematic diagram showing a shield according to an exemplary embodiment of the present disclosure.

The shield system 300 may include a plurality of main shields 310 and a plurality of auxiliary shields 320. As shown in FIG. 8, each of the plurality of main shields 310 may include a center of a top edge 311 thereof that is disposed near a focal point F formed between a corresponding incident lens among the plurality of incident lenses 212 and a corresponding exit lens among the plurality of exit lenses 222. Light may be blocked by a blocking surface 312 that extends downwardly from the top edge, so that the low beam pattern may be formed in which the light is irradiated on a region below the predetermined cut-off line CL as shown in FIG. 6.

In an exemplary embodiment of the present disclosure, a case in which the plurality of main shields 310 and the plurality of auxiliary shields 320 are respectively formed on both opposing surfaces of one of the first optical member 211 or the second optical member 221 will be described by way of example. However, the present disclosure is not limited thereto. One of the plurality of main shields 310 or the plurality of auxiliary shields 320 may be formed on any surface of one of the first optical member 211 or the second optical member 221, while the other of the plurality of main shields 310 or the plurality of auxiliary shields 320 may be formed on any surface of the other of the first optical member 211 or the second optical member 221.

Figure 9:
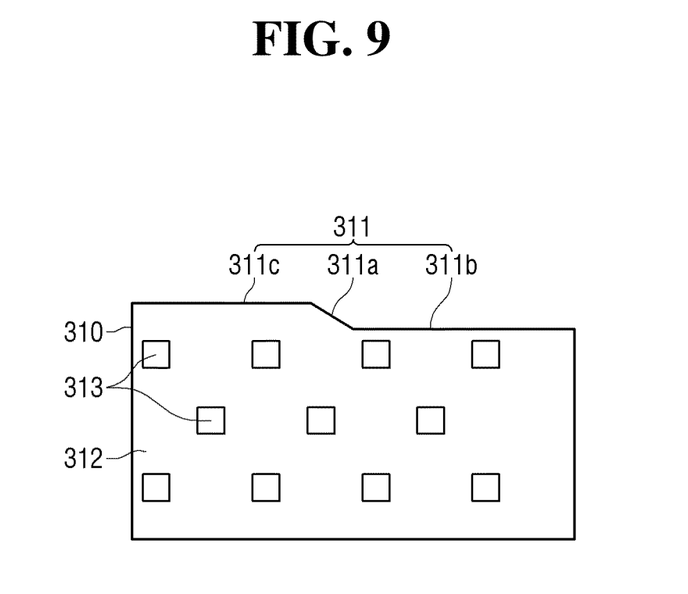
FIG. 9 is a schematic diagram showing a front surface of a shield according to an exemplary embodiment of the present disclosure.

FIG. 9 is a schematic diagram showing a front surface of the shield according to an exemplary embodiment of the present disclosure. In particular, FIG. 9 shows an example of one of the plurality of main shields 310. Referring to FIG. 9, the top edge 311 of each of the plurality of main shields 310 according to an exemplary embodiment of the present disclosure may include an inclined edge 311a disposed at a center thereof, and a lower edge 311b and an upper edge 311c having different vertical levels, while the inclined edge 311a is disposed therebetween. Accordingly, as shown in FIG. 6, the cut-off line CL of the low beam pattern formed by the lamp 1 for the vehicle according to the present disclosure may have an inclined line CL1, and an upper line CL2 and an lower line CL3 having different vertical levels while the inclined line CL1 is disposed therebetween.

A shape of the top edge 311 of each of the plurality of main shields 310 is not limited to the example described above. Depending on a country or a region, an entirety of the top edge 311 may have the same vertical level or portions of the top edge 311 may have different vertical levels.

Each of the plurality of main shields 310 may include a blocking surface 312 that blocks light traveling to each of the plurality of exit lenses 222. The blocking surface 312 may extend downwardly from the top edge 311. In an exemplary embodiment of the present disclosure, at least one transmission hole 313 may be formed in the blocking surface 312 of each of the plurality of main shields 310.

At least one transmission hole 313 may have an area of 100 $\mu m^2$ to 40,000 $\mu m^2$. When the area of the at least one transmission hole 313 is smaller than 100 $\mu m^2$, light distribution performance due to the light passing through the at least one transmission hole 313 may be deteriorated. When the area of the at least one transmission hole 313 is greater than 40,000 $\mu m^2$, light may be concentrated on a specific area, thereby causing glare.

In an exemplary embodiment of the present disclosure, a case in which a plurality of transmission holes 313 are formed in the blocking surface 312 of each of the plurality of main shields 310 will be described by way of example. Each of the plurality of transmission holes 313 may have various shapes such as a circle, a polygon, or the like. Some of the plurality of transmission holes 313 may have a shape different from that of others.

The plurality of transmission holes 313 may be uniformly distributed or dispersed throughout the blocking surface 312. When the plurality of transmission holes 313 are non-uniformly distributed, that is, are arranged in an concentrated manner across the blocking surface 312, the light that passes through the plurality of transmission holes 313 may be non-uniformly irradiated. In other words, The irradiated area may be arranged in an concentrated manner, increasing a possibility that the non-uniform brightness may occur.

In this regard, it may be understood that when the plurality of transmission holes 313 are uniformly distributed throughout the blocking surface 312, they are distributed in a non-concentrated manner in a vertical direction, a horizontal direction, and a diagonal direction.

The plurality of transmission holes 313 may transmit some of the light beams emitted from the second light source 120 therethrough without being blocked by the blocking surface 312. Accordingly, visibility of the beam pattern may be improved by expanding a lower region of the second beam pattern formed by light emitted from the second light source 120.

Figure 10:
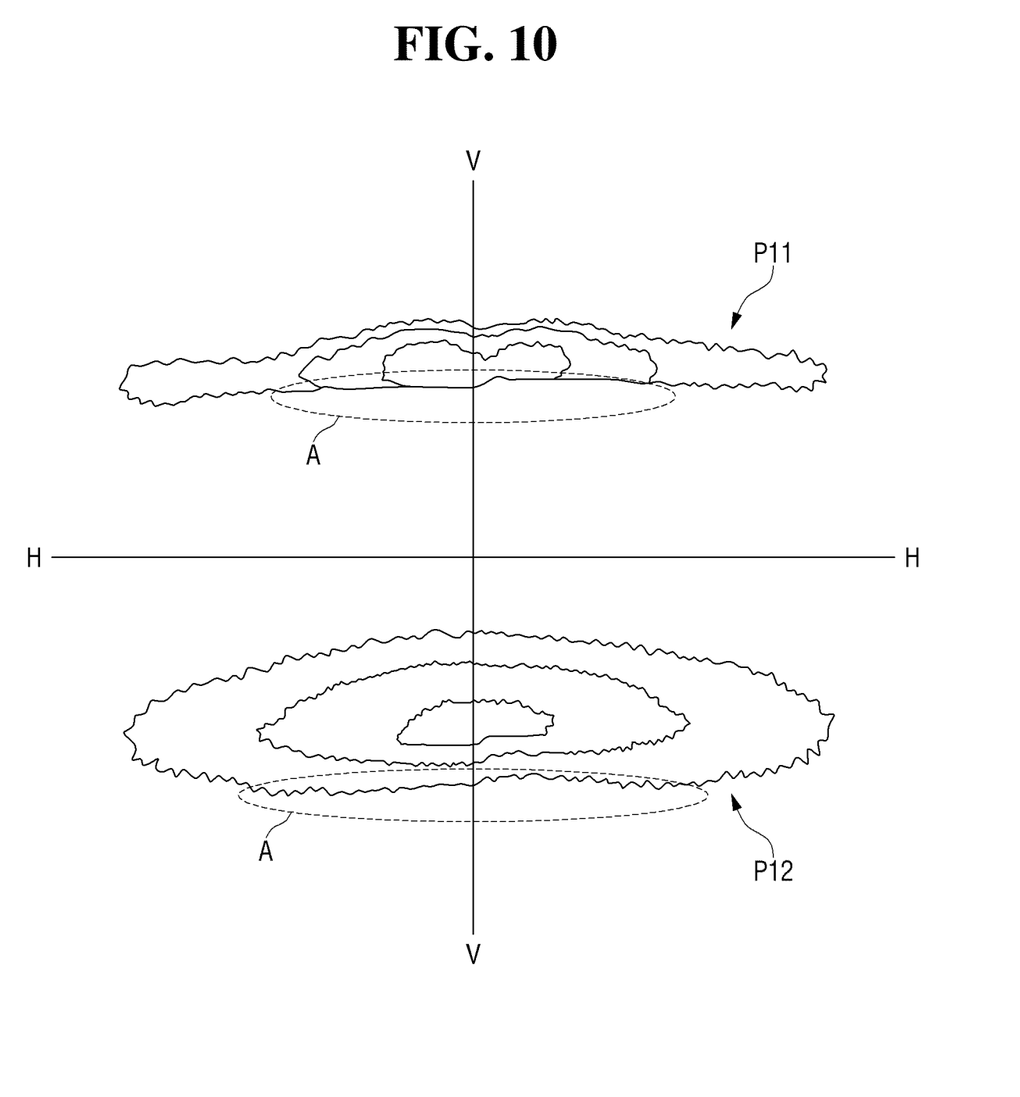
FIG. 10 is a schematic diagram showing an expanded region resulting from a transmission hole formed in a blocking surface of a shield according to an exemplary embodiment of the present disclosure.

As shown in FIG. 10, when the plurality of transmission holes 313 are formed in the blocking surface 312 of each of the plurality of main shields 310, an expanded region A may be generated so that the lower beam pattern P12 among the second beam patterns P11 and P12 may expand downwards, compared to when the plurality of transmission holes 313 are not formed in the blocking surface 312.

When the positions of the plurality of transmission holes 313 are the same in the plurality of main shields 310, there may be a limit to increasing a size of the expanded region A. Further, there is a possibility that the light may be concentrated in a specific region, causing glare. For this reason, the positions of the plurality of transmission holes 313 may be different in one of the plurality of main shields 310 than the positions of the plurality of transmission holes 313 formed in another of the plurality of main shields 310.

Figure 11:
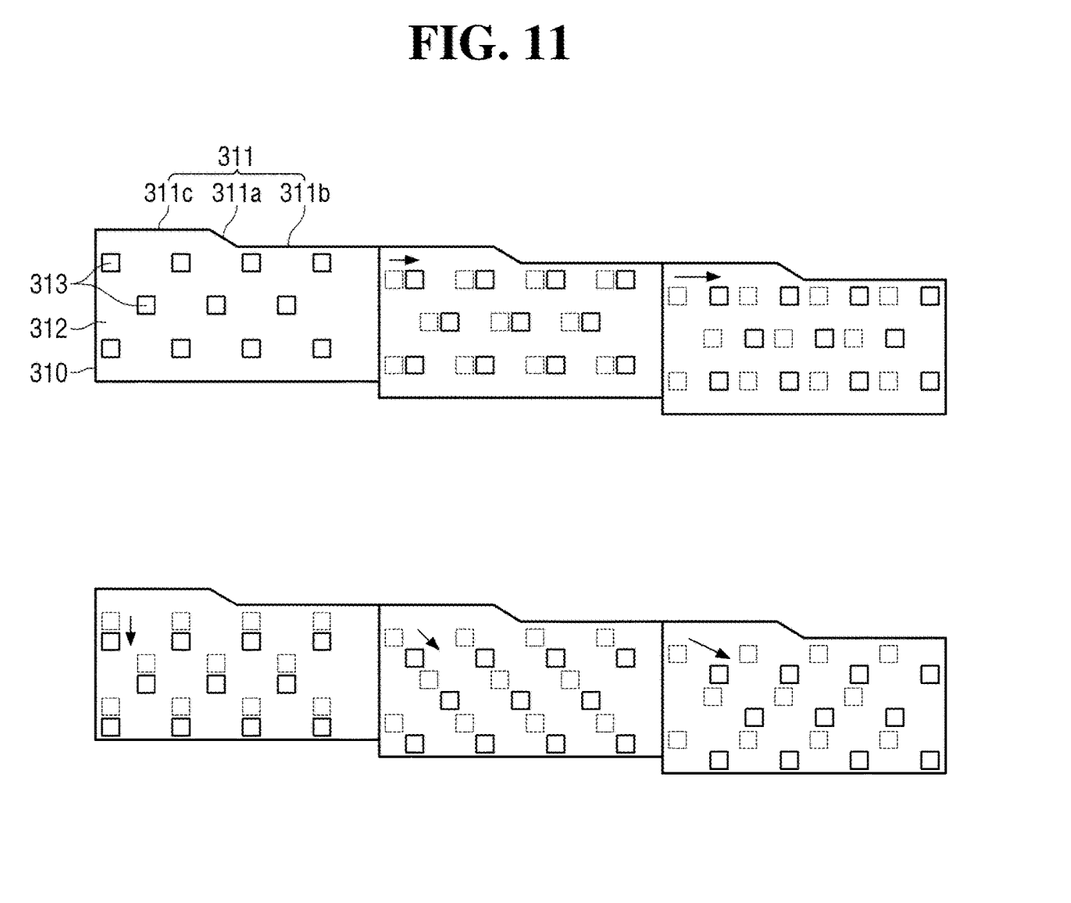
FIG. 11 is a schematic diagram showing a location of a transmission hole based on a location of a shield according to an exemplary embodiment of the present disclosure.

For example, the positions of the plurality of transmission holes 313 in the plurality of main shields 310 may be different from one another as shown in FIG. 11. FIG. 11 shows an example in which a plurality of transmission holes 313 are arranged in each of the plurality of main shields 310 in a regular pattern, and the positions of the plurality of transmission holes 313 in each of the plurality of main shields 310 are respectively displaced from the positions of the plurality of transmission holes 313 of a reference shield, which is the top left shield, depending on the direction and distance from the reference shield.

In other words, as shown in FIG. 11, the top left shield, which is used as the reference shield, may have a plurality of transmission holes 313, and a top middle shield may have a plurality of transmission holes 313 whose positions are respectively displaced toward the right side by a first distance from the positions of the plurality of transmission holes 313 of the reference shield. Subsequently, a top right shield may have a plurality of transmission holes 313 whose positions are respectively displaced toward the right side by a second distance that is greater than the first distance from the positions of the plurality of transmission holes 313 of the reference shield. Further, a bottom left shield may have a plurality of transmission holes 313 whose positions are respectively displaced in the downward direction by the first distance from the positions of the plurality of transmission holes 313 of the reference shield. A bottom middle shield may have a plurality of transmission holes 313 whose positions are respectively displaced in the right-downward direction by the first distance in each direction from the positions of the plurality of transmission holes 313 of the reference shield. Further, a bottom right shield may have a plurality of transmission holes 313 whose positions are respectively displaced in the right-downward direction by the second distance in each direction from the positions of the plurality of transmission holes 313 of the reference shield.

In this regard, the dotted lines in FIG. 11 indicate the position of each of the plurality of transmission holes 313 formed in the reference shield. A direction of an arrow indicates the direction in which the plurality of transmission holes 313 in a corresponding shield are respectively displaced with respect to the positions of the plurality of transmission holes 313 formed in the reference shield. A length of the arrow indicates a distance by which the plurality of transmission holes 313 in a corresponding shield are respectively displaced from the plurality of transmission holes 313 formed in the reference shield. The displacement distance may be proportional to the distance between the corresponding shield and the reference shield.

As described above, in an exemplary embodiment of the present disclosure, the positions of the plurality of transmission holes 313 in the plurality of main shields 310 may be formed differently from one another. Accordingly, an area to which light is irradiated through the plurality of transmission holes 313 may become relatively wider. Thus, the light may be prevented from being concentrated on a specific area, and may be more uniformly irradiated onto the entire region. Thus, the glare may be suppressed more effectively.

Each of the plurality of auxiliary shields 320 may be disposed in front of each of the plurality of main shields 310, and may prevent the light from being irradiated onto a region above the cut-off line of the beam pattern formed by the plurality of main shields 310, thereby preventing the glare.

Figure 12:
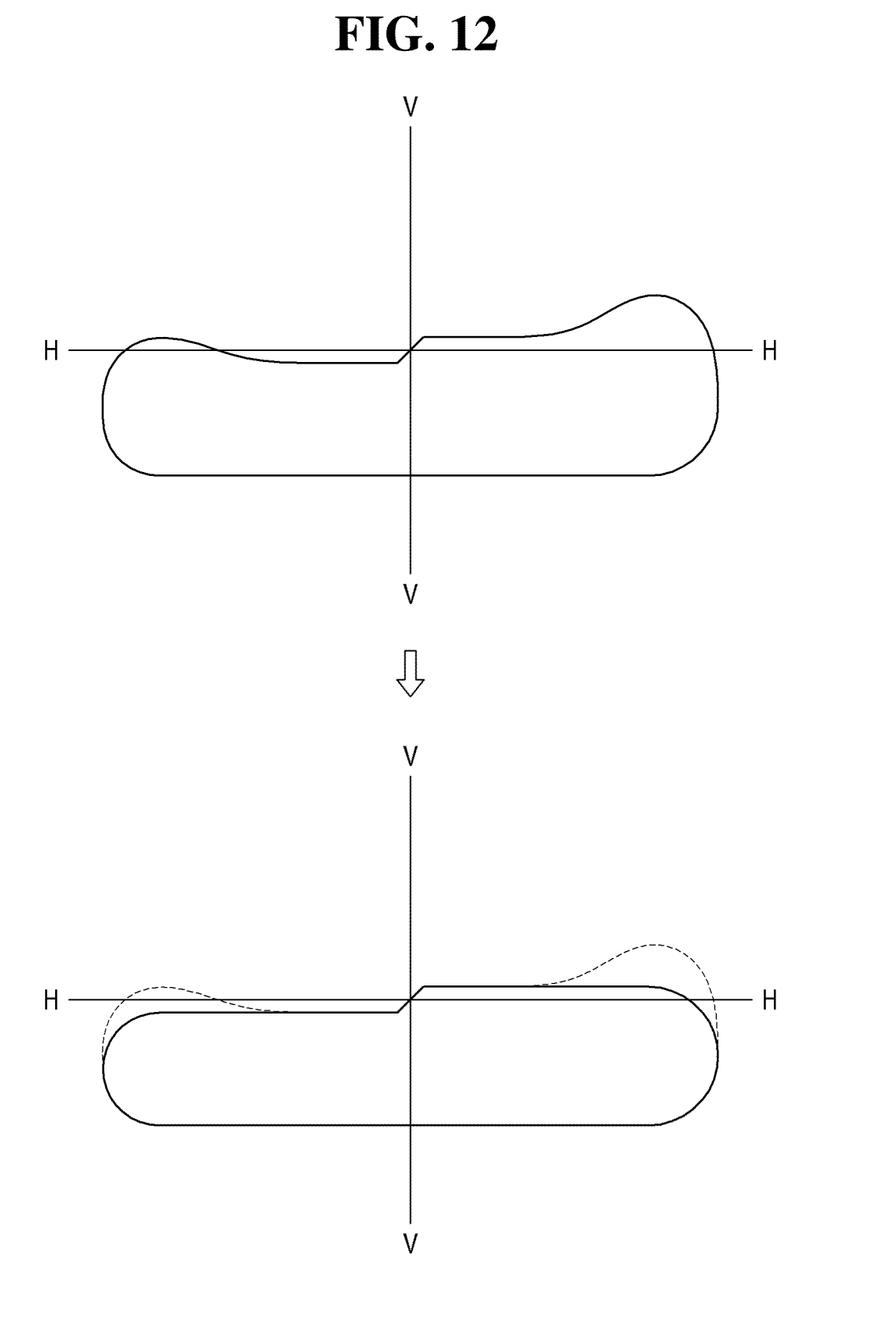
FIG. 12 is a schematic diagram showing a beam pattern formed using an auxiliary shield according to an exemplary embodiment of the present disclosure.

In other words, the plurality of auxiliary shields 320 may allow the upper line CL2 and the lower line CL3 to extend horizontally as shown in the cut-off line CL of FIG. 6. The upper line CL2 and the lower line CL3 of the cut-off line CL are mainly formed by light beams exiting from lower ones of the plurality of exit lenses 222. In this regard, the plurality of auxiliary shields 320 may block some of the light beams from being incident to lower ones of the plurality of exit lenses 222. Thus, the upper line CL2 and the lower line CL3 of the cut-off line CL may be formed to extend more horizontally, compared to a beam pattern formed when the plurality of auxiliary shields 320 are omitted (shown with the dotted line in FIG. 12). Accordingly, the beam pattern of FIG. 6 may be formed more effectively.

In an exemplary embodiment of the present disclosure, it may be seen that a top of each of the plurality of auxiliary shields 320 is disposed below a top of a corresponding main shield among the plurality of main shields 310. This is because when the top of each of the plurality of auxiliary shields 320 is disposed above the top of the corresponding main shield, the amount of blocked light may be relatively increased, thereby reducing the light efficiency.

Further, a protrusion 321 (see e.g., FIG. 4) that protrudes upwards may be formed on a portion of the top of each of the plurality of auxiliary shields 320. The protrusion 321 may suppress the glare and may prevent the glare from being directed to a driver of a vehicle in front of the vehicle having the lamp 1 according to the present disclosure.

As described above, in the lamp 1 for the vehicle according to the present disclosure, at least some of light beams blocked by the plurality of main shields 310 may be used to expand the beam pattern, thereby improving the light efficiency.

In concluding the detailed description, those skilled in the art will appreciate that many variations and modifications can be made to the exemplary embodiments without substantially departing from the principles of the present invention. Therefore, the disclosed exemplary embodiments of the invention are used in a generic and descriptive sense only and not for purposes of limitation.

What is claimed is:
1. A lamp for a vehicle, the lamp comprising:
 a light source system;
 a lens system including:
  a plurality of incident lenses onto which light emitted from the light source system is incident; and
  a plurality of exit lenses to output the light incident thereto from the plurality of incident lenses to form predetermined beam patterns; and
 a shield system including a plurality of main shields to block some of light beams from being directed to the plurality of exit lenses,
 wherein each of the plurality of main shields includes:
  a blocking surface that extends downwardly from a top edge of the each of the plurality of main shields, the top edge forming a predetermined cut-off line of a low beam pattern, to block at least some of the light beams from being directed to the plurality of exit lenses; and
  a plurality of transmission holes formed below the top edge of the each of the plurality of main shields and within the blocking surface to allow transmission of some other of the light beams,
 wherein the plurality of transmission holes are arranged in a regular pattern in the each of the plurality of main shields, and wherein a position of the regular pattern within each main shield with reference to the top edge of the each main shield is varied based on a relative position of the each main shield with respect to a reference main shield among the plurality of main shields.

2. The lamp of claim 1, wherein the light source system comprises:
a first light source for generating light for forming a first beam pattern, which is the low beam pattern;
a second light source for generating light for forming a second beam pattern; and
an optical path adjustment member for adjusting a path of the light emitted from at least one of the first light source or the second light source.

3. The lamp of claim 2, wherein the first light source and the second light source are configured to respectively generate light beams having different luminous intensities.

4. The lamp of claim 2, wherein the first light source is disposed near a central axis of the lens system, and the second light source is disposed above and/or below the first light source.

5. The lamp of claim 2, wherein some of light beams that reach each of the plurality of main shields among entire light beams emitted from at least one of the first light source or the second light source are transmitted to the plurality of exit lenses through the plurality of transmission holes.

6. The lamp of claim 2, wherein the second beam pattern is a daytime running lamp pattern.

7. The lamp of claim 2, wherein the plurality of transmission holes allow the second beam pattern to expand downwards to form an expanded region.

8. The lamp of claim 1, wherein the shield system further includes a plurality of auxiliary shields respectively disposed in front of the plurality of main shields.

9. The lamp of claim 8, wherein a top of each of the plurality of auxiliary shields is disposed below a top of corresponding main shield among the plurality of main shields.

10. The lamp of claim 8, wherein the lens system further includes:
a first optical member having an incident surface and an exit surface, wherein the plurality of incident lenses are arranged on the incident surface of the first optical member; and
a second optical member having an incident surface and an exit surface, wherein the incident surface of the second optical member faces the exit surface of the first optical member, and the plurality of exit lenses are arranged on the exit surface of the second optical member,
wherein the plurality of main shields are arranged on the incident surface of one of the first optical member or the second optical member, and the plurality of auxiliary shields are arranged on the exit surface of one of the first optical member or the second optical member.

* * * * *